April 29, 1952     C. J. PENTHER ET AL     2,594,984

THERMOSTATIC CONTROLLER

Filed April 9, 1949

Inventors:
Carl J. Penther
William B. Milligan
By
their Attorney.

Patented Apr. 29, 1952

2,594,984

UNITED STATES PATENT OFFICE 2,594,984

THERMOSTATIC CONTROLLER

Carl J. Penther, Oakland, and William B. Milligan, Albany, Calif., assignors to Shell Development Company, San Francisco, Calif., a corporation of Delaware Application April 9, 1949, Serial No. 86,542

2 Claims. (Cl. 201—48)

This invention pertains to temperature regulators and relates particularly to a thermostat system whereby the temperature of a zone maintained at a constant temperature by an intermittent heat source is stabilized against variations due to changes in the heat demand on the system.

Temperature controllers of the intermittent or "on-and-off" type, such as mercury or bi-metallic strip controllers, are capable, under certain conditions, of maintaining the temperature of a zone such, for example, as a liquid bath, at a value which is very close to that desired. However, when the ambient temperature varies, or the heat demand on the controlled zone changes for any reason whatsoever, the temperature of the controlled zone has been found to undergo a permanent change or offset to a value which is higher or lower than that for which the system had been adjusted.

With intermittent or "on-and-off" controllers, the magnitude of the minimum temperature excursion or variation about the control point is limited by the sensitivity of the controller. For example, in the case of a mercury thermostat, a metallic wire is used to make contact with a rising capillary mercury column. Since a fairly low resistance is required to operate a relay, even when a thermionic relay is used, the mercury must rise until a sufficient area of contact with the wire is established to produce such resistance. On the reverse portion of the cycle, the resistance must increase to a very high value before contact is broken. Both these conditions tend to cause the system to hunt.

An excursion or hunting amplitude of minimum value can be obtained under circumstances such as described above only when the power or wattage supplied to the control heater is very low. Since this heater has a thermal lag or inertia, the system tends to overshoot the control mark or temperature when the heater temperature is permitted to rise materially over that of the controlled zone during the "on" portion of the cycle. It is therefore customary to maintain the supply of the intermittent heat at as low a value as possible, which is satisfactory as long as the heat loss or demand remains relatively constant. If, however, the demand increases, the average temperature of the controlled zone decreases until the reserve of additional heat available from increasing the "on" period of the cycle at the expense of the "off" period is exhausted, and complete loss of temperature control results. The reverse happens when the heat loss or demand decreases, and the equally small reserve available from increasing the "off" time is exhausted.

It is therefore an object of this invention to provide for the above purpose a system comprising an intermittent heater and a steady heater, which is capable of automatically adjusting its heat output in proportion to the variations of the heat demand on the system and thus of maintaining the intermittent heater at the optimum point of its operating range with equal on and off periods.

It is another object of the present invention to provide a thermostatic controller wherein the amount of heat supplied by the steady heater is automatically adjusted in proportion to the relative length of the "on" and "off" periods of the intermittent heater.

These and other objects of this invention will be understood from the following description, with reference to the attached drawings, wherein.

The principle of operation of the present system will be clear from the following brief considerations. As stated hereinabove, an increased heat demand on a typical intermitter thermoregualtor system results in an increase of the "on" period of each cycle, while a decreased heat demand increases the "off" period. The complete cycle comprising an "on" and an "off" period, is however substantially a function of the thermoregulator itself, that is, of the capacity of the heater and of other constants of the system, and does not normally change for any given adjustment of the system. If, therefore, the "on" and "off" periods of each cycle are automatically compared, an unbalance between them, denoting a surplus or deficiency of heat supply, can be used to apply a suitable correction to the adjustment of the steady heater. Variations in heat demand will thus be met by automatic readjustments of the steady heater, and will not affect the operation of the on-and-off heater nor result in permanent changes of the temperature of the controlled zone.

Figure 1:
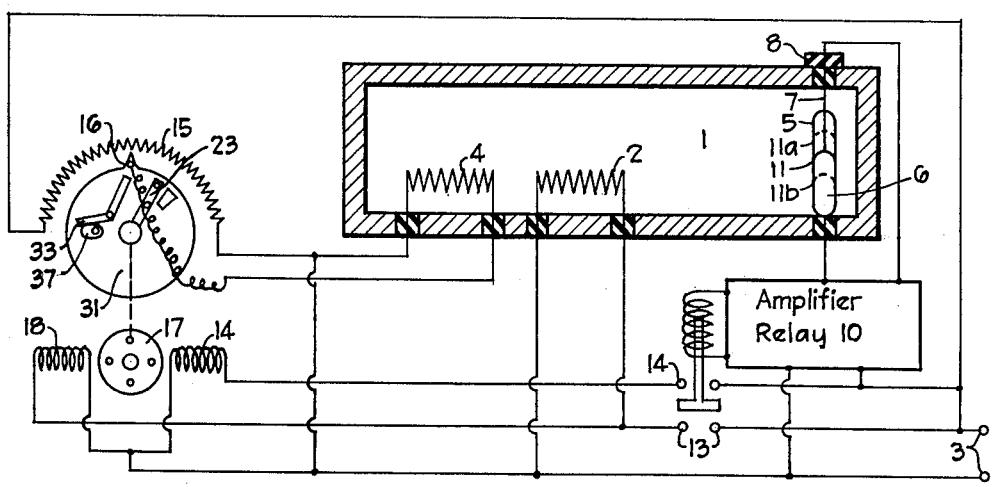
Fig. 1 is a simplified circuit diagram of the present control system.

Referring to Fig. 1, the system of the present invention is shown to comprise a controlled zone, such for example as a liquid bath 1.

The temperature of this zone is kept constant by the operation of an intermittent heater 2, which is energized from any suitable power source, such, for example, as a standard supply line 3 operating at 115 volts and 60 cycles.

The intermittent heater 2 may be controlled by any suitable means, such as bi-metallic switches, mercury switches, etc. A conventional mercury switch is diagrammatically shown in Fig. 1 and briefly described here insofar as necessary to illustrate the present invention.

The switch may comprise a glass envelope 5 in which a column of mercury 6, preferably of capillary dimensions, is arranged so as to contact by expansion at a predetermined temperature a wire 7, whose point is adjusted to a level corresponding to said predetermined temperature by means such as a calibrated knob 8. Both the wire 7 and the mercury 6 are electrically connected to a suitable amplifier and switch relay circuit 10.

As soon as the desired or control temperature is reached and contact with the wire 11 is made by the mercury reaching a level 11 under the effect of increasing temperature, the amplifier relay switch 10 opens the contacts 13 and disconnects the heater 2.

However, due to the inertia of the system, to the heat stored in the heater 2, etc., the temperature of the bath continues to rise, after the heater has been disconnected, to a value corresponding to a mercury level 11a. In a similar manner, on the opposite or cooling down phase of the operations, the temperature will continue to go down until the mercury reaches a level 11b, even though the heater 2 had been energized or reconnected at level 11.

Figure 3:
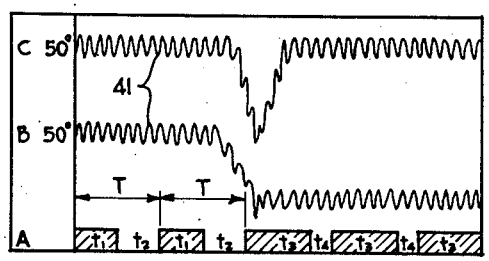
Fig. 3 is an idealized chart of controlled temperature variations traced by a recorder.

Thus, if the mercury switch 5 has been set for a control temperature of 50°, the actual temperature of the bath may vary, for example, between 49.99° and 50.01° as indicated at 41 for curves B and C, Fig. 3. The time periods during which the heater 2 is energized and de-energized are diagrammatically indicated by $t_1$ and $t_2$ on curve A, said curve being however drawn to a time scale different from that of curves B and C.

During normal operations, periods $t_1$ and $t_2$ are equal, and the system gives the desired close control. If, however, the heat demand changes, for example, if the heat losses of the whole system increase due to a lowering of the surrounding temperature, then the heating of the bath takes place at a lower rate, and its cooling at a higher rate. To compensate for this, the time $t_3$, during which the heater 2 is on, becomes longer than the time $t_4$ during which it is off, as shown in Fig. 3, the total time cycle T being relatively constant for the system for any particular adjustment thereof.

However, due to the factors mentioned above (inertia of the system, small value of the available heat reserve, etc.) even this increase of the "on" period and the corresponding decrease of the "off" period is insufficient to maintain in such case a conventional temperature regulator system at the desired temperature, a permanent change of the temperature of the controlled zone being experienced for each new increase in heat demand.

Thus, as an example, a precision differential thermal regulator may, under constant ambient conditions, regulate the temperature of a viscosity bath with an accuracy of ±0.01° C., as indicated by curve B in Fig. 3. An increase in heat demand of 50 watts produces however a permanent drop of 0.05° C. in the mean temperature of the bath, thereby completely destroying the desired range of accuracy of the device.

In order to prevent ambient temperature changes from thus upsetting the operation of the thermal regulator, the present system is provided, in addition to the intermittent heater 2, with a steady heater 4 whose purpose it is to compensate for heat demand changes.

The steady heater 4 is connected to the power supply 3 through a potentiometer circuit comprising a rheostat winding 15 and a variable contact 16 sliding thereon, whereby any desired fraction of the voltage from terminals 3 may be applied to heater 4, thereby determining the amount of heat generated by said heater. The rheostat device may be of the ordinary resistor type, or of any other desired type, such for example as a toroidal transformer of the type described in U. S. Patent 2,009,013.

The sliding contact 16 is moved in a manner to be described hereinbelow, along the winding 15 by means of a reversible motor 17 coordinated with the operation of the intermittent heater 2.

The relay switch 10 has two pairs of contacts, as shown at 13 and 14 respectively. When the contacts 13 are closed and the heater 2 is energized, power is also applied to a winding 18 of motor 17, causing said motor to rotate in one direction. When the contacts 14 are closed and the heater 2 is off, power is supplied to the winding 19 of motor 17, causing said motor to rotate in the opposite direction.

Since the motor 17 thus drives the contact 16 in one direction along the winding 15 during the "on" periods of the intermittent heater 2 and in the opposite direction during the "off" periods, it will be seen that the present system provides an arrangement for comparing the relative lengths of said "on" and "off" periods, and for adjusting the setting of the steady heater 4 in accordance therewith.

Thus, for example, if the heat demand on the system has increased, causing the "on" periods to become longer than the "off" periods, the contacts 13 will be closed for a longer portion of every cycle than contacts 14. The winding 18 will therefore be energized, and the motor 17 will rotate in one direction, for example, counterclockwise, for a longer time than in the other direction during each cycle. The resulting gradual motion of the contact 16 along the winding 15, which continues so long as the "on" periods remain longer than the "off" periods of the intermittent heater, causes a gradual increase of the voltage applied to the steady heater 4, and of the amount of heat generated thereby, thus tending to cure the condition (i. e. a heat loss exceeding the heat supply) causing the unbalance between the length of the "on" and "off" periods of operation.

It will, however, be seen that since the motor 17 operates continuously, the sliding contact 16, if driven directly thereby, will also be continuously in motion along the winding 15. Thus, when the system is in balance and the "on" periods are equal to the "off" periods, the contact 16 will oscillate equally first in one direction and then in another from a central position. When the "on" periods are longer than the "off" periods, the contact 16 will move in the correct direction during the major portion of the cycle, but will reverse and move in the opposite direction throughout the smaller portion of the cycle. Since such operation results not only in an undesirable wear on the rheostat device, but also in a decrease of the system's stability and other undesirable effects, the present invention provides coupling means connected between the reversible motor and the contact 16, whereby the contact 16 is not moved at all when the "on" and the "off" cycle periods are equal, and is moved intermittently but steadily in one single direction when one of said cycle periods is longer than the other.

Figure 2:
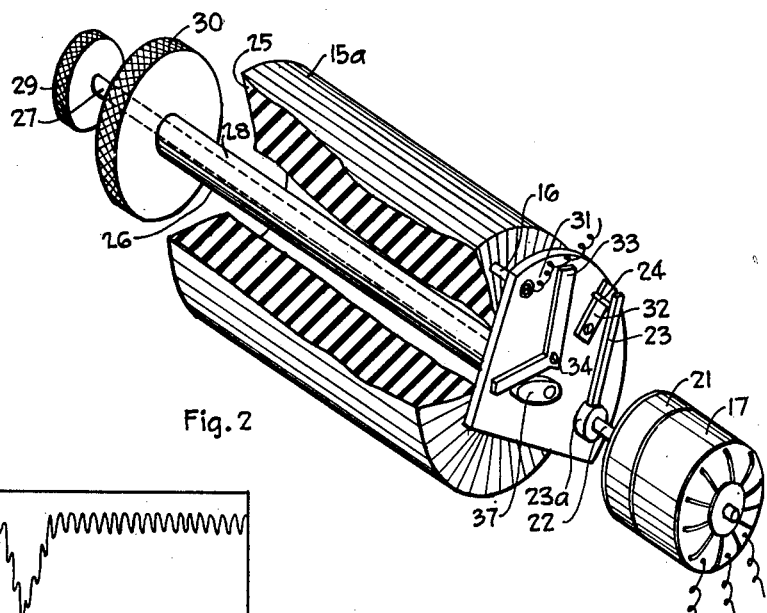
Fig. 2 is a perspective view, partly in cross-section, of a mechanical embodiment of the controller of the present invention.

The construction and operation of the coupling system will be clear from a reference to Fig. 2, wherein parts identical to those of Fig. 1 are indicated by the same numerals.

Fig. 2 shows the reversible motor 17 driving a shaft 22 through a suitable reduction gear box 21. Attached to the shaft 22 by means of a friction clutch 23a, which permits a manual setting of the rheostat, is a rocker arm 23 which carries a pin 24.

The variable resistance 15 is shown in Fig. 2 in the form of a toroidal transformer comprising a wire 15a wound on a hollow cylindrical core 25.

Arranged coaxially within the core 25 is a double shaft member 26 comprising an inner stem member 27 and an outer concentric tubular stem member 28.

The outer shaft 28 is fixedly attached at one end to a calibrated dial knob 30, and at the other end to a plate 31, carrying the sliding contact element 16 of Fig. 1.

The inner shaft 27 is attached at one end to a calibrated knob 29, and at the other end to a rotatable cam element 37.

The plate 31 carries attached thereto a fixed stop member 32, and an adjustable stop member 33. By rotating knob 29, shaft 27 and cam 37, the adjustable stop member 33 can be pivoted about a point 34, whereby the distance between the fixed and the adjustable stop members can be varied between desired limits.

It will be seen that although the shaft 22 of the motor 17 is arranged coaxially with the shaft 26 within the transformer coil 25, there is no direct connection between elements forming part of the motor structure and elements forming part of the transformer core structure except through the action of pin 24 on arm 23 engaging the stops 32 and 33 on plate 31.

The operation of the present device may therefore be briefly outlined as follows:

The toroidal transformer 15 is adjusted by means of the calibrated dial 30, shaft 28 and contact 16, to such a setting as to supply the steady heater 4 with an amount of power sufficient for maintaining the bath 1, in cooperation with the action of the intermittent heater 2, at the desired temperature, for example, 50° C.

Assuming that this temperature is reached and is being maintained, the intermittent heater 2 operates under normal conditions, that is, the "on" and the "off" periods are of equal duration. The motor 17 and the arm 23 will therefore rotate in a clockwise and in a counterclockwise direction throughout equal periods of time, for example, 15 seconds in each direction.

By means of the calibrated knob 29 and cam 31, the adjustable stop member 33 is moved to such an angular position with regard to the fixed stop 32 that the pin member 24 takes 15 seconds to traverse the arcuate path between said stops. That is, the pin 24, when it is barely touching or preferably only closely approaching the fixed stop 32 in a clockwise direction, will reverse and move for 15 seconds in a counterclockwise direction. When barely touching or closely approaching the adjustable stop 33, the arm 23 and pin 24 will again reverse, and repeat the operation. The contact, if any, of pin 24 with stops 32 and 33, is so slight as not to disturb the position of plate 31, and the contact 16 therefore remains in its original position with regard to the winding of the transformer.

When, however, an increased heat demand on the system causes the "on" period to become longer than the "off" period, the motor 17 will rotate, for example, 20 seconds in a counterclockwise direction, and only 10 seconds in a clockwise direction. It will be seen that when such change occurs, the pin 24 will, for example, contact the adjustable stop 33 at the end of a 15 second period, and will then drive it on in a counterclockwise direction for another 5 seconds. It will then reverse its direction and rotate clockwise for 10 seconds, whereupon, before reaching the fixed stop 32, it will again rotate counterclockwise for 20 seconds, thus driving the plate 31 and the contact 16 still further in the counterclockwise direction. This action will be repeated on each cycle so long as the "on" and "off" periods of the intermittent heater 2 are unequal, the intermittent displacement of the contact 16 in one single direction along the resistor or transformer wire resulting in modifying the amount of heat generated by the steady heater 4 in such a manner as to counteract the condition which tends to make the "on" and the "off" periods of the intermittent heater 2 unequal. When said condition has been neutralized, the bath has reverted to its desired controlled temperature, and the "on" and "off" periods have again become equal, the arm 23 and pin 24 will resume their cyclical oscillation between the stops 32 and 33 without disturbing the setting of the plate 31 with the contact 16 in its new position on the transformer winding.

We claim as our invention:

1. A rheostat control system for thermostat heaters having on and off cycles of operation, said control system comprising a reversible motor having a shaft rotating in opposite directions during said on and off cycles of operation, a rocker element carried by said shaft and rotating therewith, a toroidal rheostat winding co-axial with said shaft, a contact slidably mounted on said winding along a line concentric with the axis thereof to regulate the effective resistance of the rheostat, a support member for said contact rotatable about the axis of said toroidal winding, stop means on said support member engageable with the motor rocker element, and means for adjusting the position of said stop means, said position determining the extent of the cycle portion during which the rotation of the rocker element is transmitted to the contact support member.

2. A rheostat control system for thermostat heaters having on and off cycles of operation, said control system comprising a reversible motor adapted to rotate in opposite directions during said on and off cycles of operation, an actuator element driven in opposite directions by the rotation of said reversible motor, a rheostat winding, a movable contact element slidably mounted on said rheostat winding to regulate the effective resistance thereof, and coupling means for engaging said actuator element with said movable contact element, said coupling means comprising spaced stop means carried by one of said elements, the spacing between said stop means determining the extent of the cycle portion during which the contact element is moved by the actuator element.

CARL J. PENTHER.
WILLIAM B. MILLIGAN.

REFERENCES CITED

The following references are of record in the file of this patent:

UNITED STATES PATENTS

| Number | Name | Date |
|---|---|---|
| 1,810,172 | Hayes | June 16, 1931 |
| 1,960,162 | Mooreshead | May 22, 1934 |
| 2,095,383 | Finch | Oct. 12, 1937 |
| 2,119,153 | Dallenbach | May 31, 1938 |